(12) United States Patent
Singh et al.

(10) Patent No.: US 8,605,724 B2
(45) Date of Patent: Dec. 10, 2013

(54) SYSTEMS AND METHODS FOR MINIMIZING THE NUMBER OF FORWARDING IDENTIFIERS IN A NETWORK ELEMENT WITH DISTRIBUTED ARCHITECTURE

(75) Inventors: Bijendra Singh, Plano, TX (US); Arun Saha, Sunnyvale, CA (US); Melvin Tan Wee Loon, Plano, TX (US)

(73) Assignee: Fujitsu Limited, Kawasaki-shi (JP)

( * ) Notice: Subject to any disclaimer, the term of this patent is extended or adjusted under 35 U.S.C. 154(b) by 748 days.

(21) Appl. No.: 12/753,550

(22) Filed: Apr. 2, 2010

(65) Prior Publication Data

US 2011/0243135 A1    Oct. 6, 2011

(51) Int. Cl.
*H04L 12/28* (2006.01)
(52) U.S. Cl.
USPC ............................ 370/392; 370/398; 370/401
(58) Field of Classification Search
USPC ......................................... 370/390, 392, 401
See application file for complete search history.

(56) References Cited

U.S. PATENT DOCUMENTS

| | | | |
|---|---|---|---|
| 6,977,932 B1 * | 12/2005 | Hauck | 370/392 |
| 7,916,736 B2 * | 3/2011 | Shvodian et al. | 370/395.5 |
| 2004/0022257 A1 * | 2/2004 | Green et al. | 370/401 |
| 2008/0123833 A1 * | 5/2008 | Hara | 379/219 |

* cited by examiner

*Primary Examiner* — Hassan Kizou
*Assistant Examiner* — Emmanuel Maglo
(74) *Attorney, Agent, or Firm* — Baker Botts L.L.P.

(57) ABSTRACT

A method may include, by a first network interface: receiving a packet having a flow via a first port of the first network interface; examining the packet to determine an ingress local forwarding identifier (LFID) associated with the flow of the packet; converting the ingress LFID to a global forwarding identifier (GFID) of the network element; and forwarding the packet to a switching element. The method may also include, by the switching element: determining a second network interface for egress of the packet based on the GFID; and forwarding the packet to the second network interface. The method may further include, by the second network interface: converting the GFID to an egress LFID associated with the flow of the packet; and forwarding the packet to a second port of the second network interface and a flow of the second network interface based on the egress LFID.

12 Claims, 3 Drawing Sheets

SYSTEMS AND METHODS FOR MINIMIZING THE NUMBER OF FORWARDING IDENTIFIERS IN A NETWORK ELEMENT WITH DISTRIBUTED ARCHITECTURE

TECHNICAL FIELD

This invention relates generally to the field of communications systems and more specifically to forwarding data in a network element with distributed architecture.

BACKGROUND

A communication network includes network elements that switch packets through the network. A network element for use in communications networks may use a "distributed" architecture where in a packet undergoes processing at multiple processing resources. Such an architecture often permits greater scalability and fault isolation, but may also add complexity to forwarding of traffic in the network element. To illustrate, in distributed switching systems, part of the switching functionality is performed on an ingress line card, and part of functionality is carried out on an egress line card. Accordingly, the ingress line card must be able to provide an identifier (e.g., a forwarding identifier) so that correct operations can be performed on the packet in rest of the network element. A forwarding identifier (or forwarding ID) is a numeric identifier internal to a network element. The forwarding ID allows the network element to forward a frame, packet, or other data structure through various elements of the network element, starting from the ingress port and ending at the egress port.

In data forwarding systems such as distributed architecture-based Ethernet bridges or switches, a packet coming in on any port on any network interface card may get forwarded out through any port on any network interface card in the same forwarding domain. As the number of line cards, ports in a network element increase linearly, the number of such identifiers increases quadratically to meet the requirement of any port to any port forwarding requirement. For a network element with N ports, the number of forwarding identifiers needed is N times (N−1), meaning that a network element with 300 ports may require on the order of 90,000 forwarding IDs. Maintenance of such a large number of forwarding IDs may require undesirable complexity.

SUMMARY OF THE DISCLOSURE

In accordance with the present invention, disadvantages and problems associated with forwarding of network traffic in a distributed network element architecture may be reduced or eliminated.

In accordance with one embodiment of the present disclosure, a network element may include a first network interface, a switching element communicatively coupled to the first network interface, and a second network interface communicatively coupled to the switching element. The first network interface may be configured to: (a) receive a packet having a flow via a first port of the first network interface; (b) examine the packet to determine an ingress local forwarding identifier (LFID) of the first network interface associated with the flow of the packet; (c) convert the ingress LFID to a global forwarding identifier (GFID) of the network element; and (d) forward the packet to a switching element communicatively coupled to the first network interface. The switching element may be configured to: (a) based on the GFID, determine a second network interface for egress of the packet; and (b) forward the packet to the second network interface. The second network interface may be configured to: (a) convert the GFID to an egress LFID of the second network interface associated with the flow of the packet; and (b) forward the packet to a second port of the second network interface and a flow of the second network interface based on the egress. For all ingress flows which have the same destination, their associated LFIDs may map to the same GFID, irrespective of their ingress port or interface card. This eliminates the need for separate GFID for each LFID.

Certain embodiments of the invention may provide one or more technical advantages. For example, a technical advantage of one embodiment may be that components of a network element may not need to maintain a numerous number of identifiers (e.g., forwarding identifiers), as it the case with traditional approaches.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawing, in which.

DETAILED DESCRIPTION OF THE DRAWINGS

Figure 1:
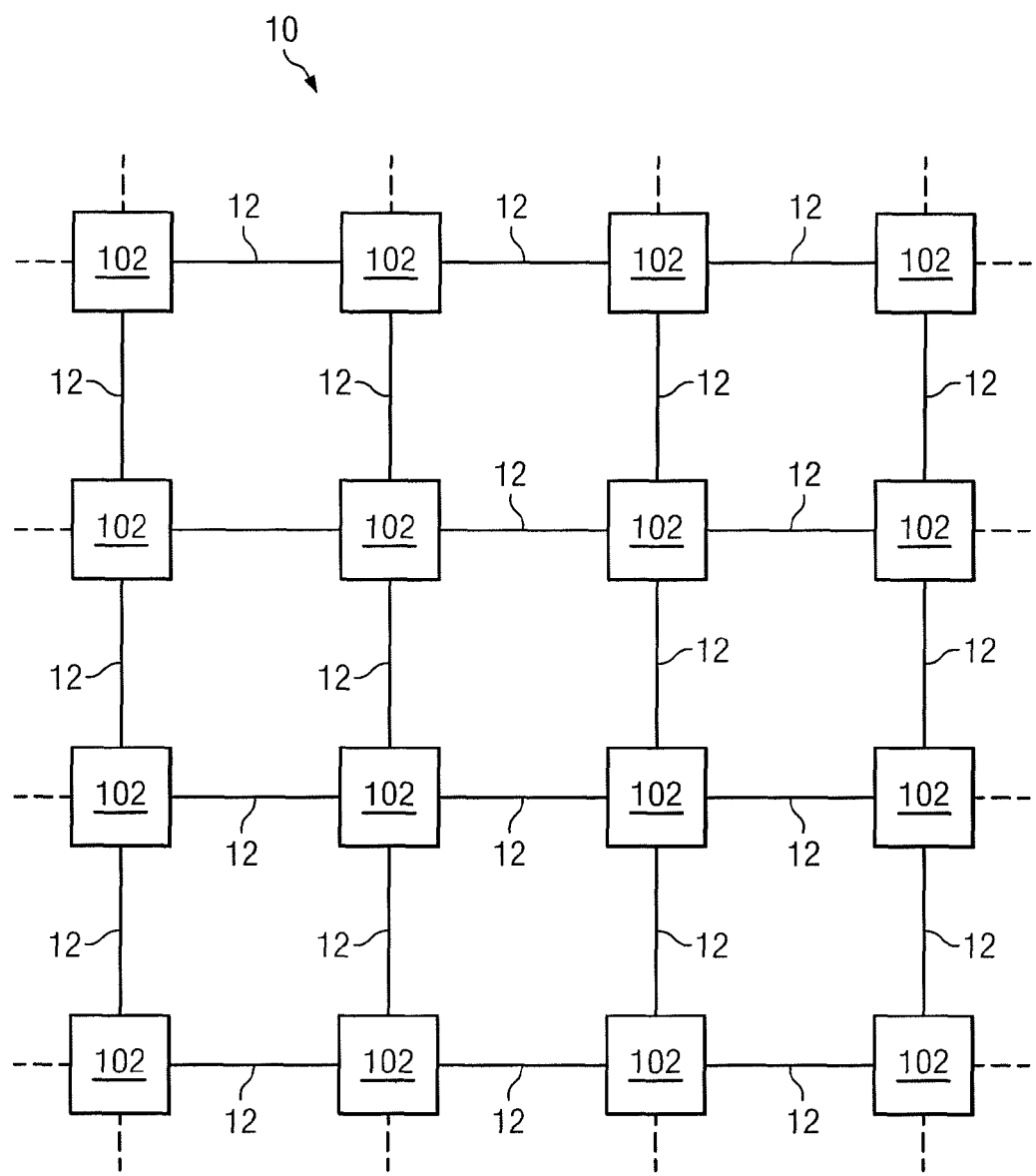
FIG. 1 illustrates a block diagram of an example network, in accordance with certain embodiments of the present disclosure.
Figure 2:
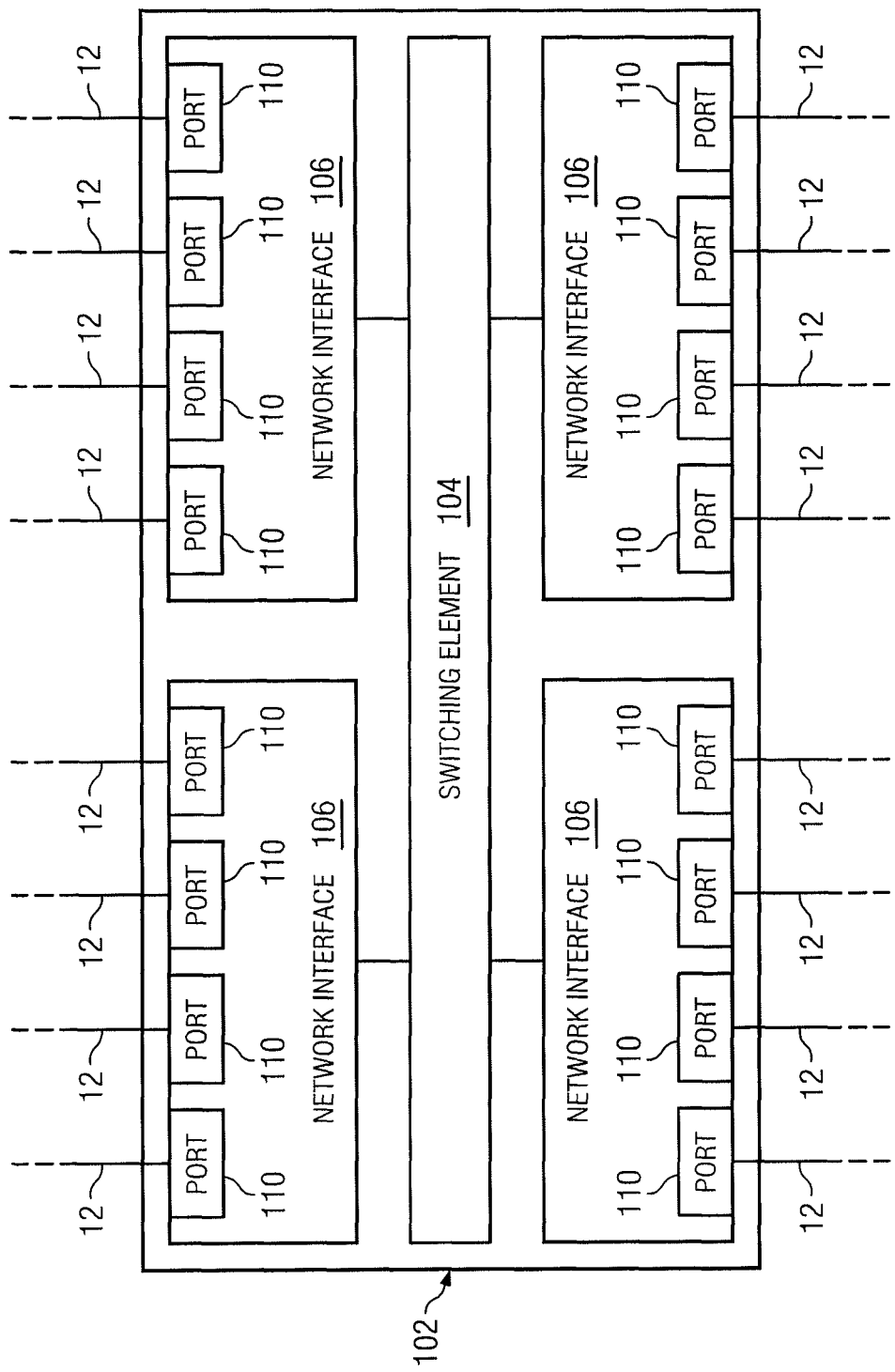
FIG. 2 illustrates a block diagram an example network element, in accordance with certain embodiments of the present disclosure.
Figure 3:
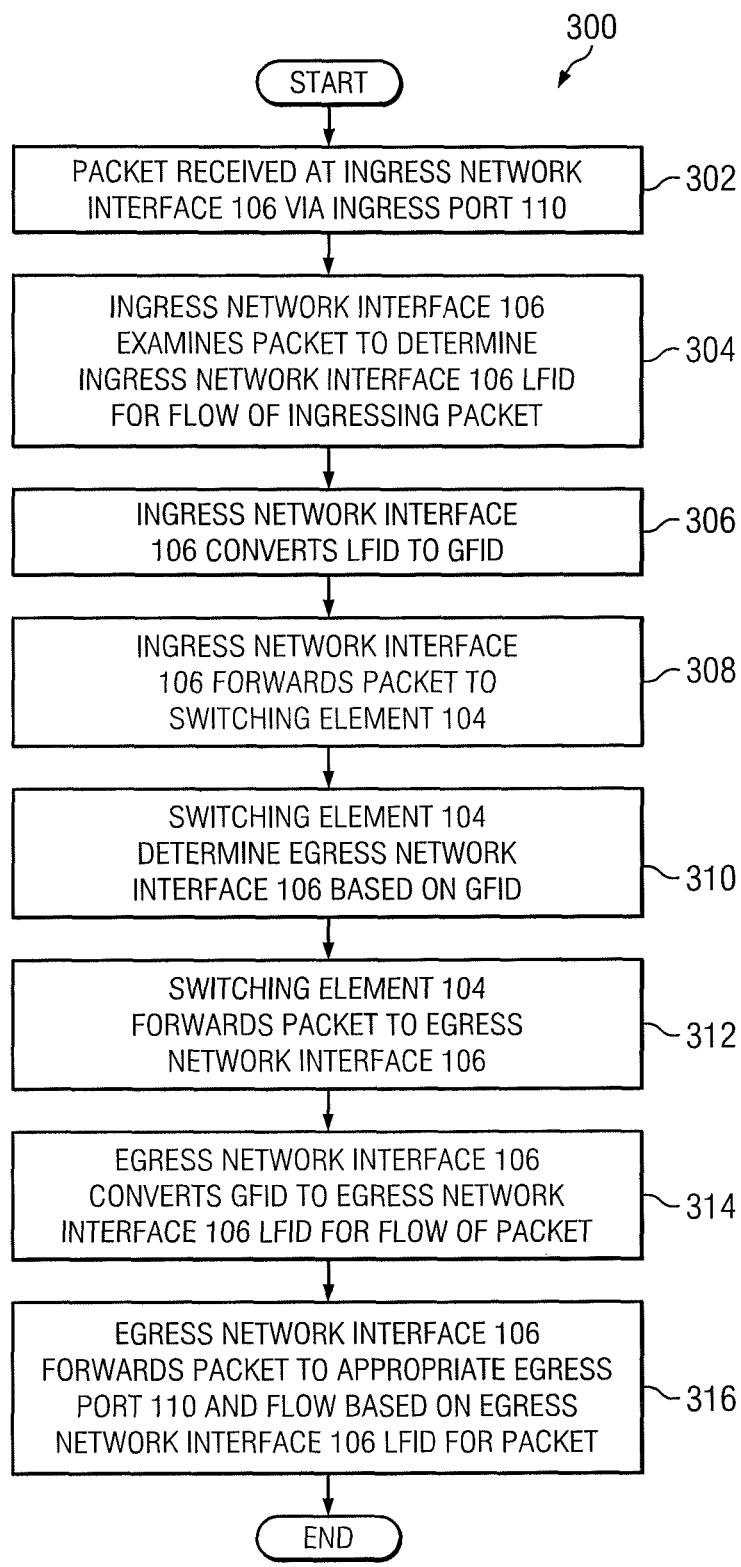
FIG. 3 illustrates a flow chart of an example method for forwarding data in the network element of FIG. 2, in accordance with certain embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other network elements 102 to create a mesh. However, any suitable configuration of any suitable number of network elements 102 may create network 10. Although network 10 is shown as a mesh network, network 10 may also be configured as a ring network, a point-to-point network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream. For the purposes of this disclosure, the term "packet" may be used generally to refer to a packet, frame, unstructured bit stream, or any other data structure configured to communicate as traffic.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to forward data received by network element 102 to another device (e.g., another network element 102) coupled to network element 102.

As depicted in FIG. 2, a network element 102 may include a switching element 104, and one or more network interfaces 106 communicatively coupled to switching element 104.

Switching element 104 may include any suitable system, apparatus, or device configured to receive traffic via a port 110 and forward such traffic to a particular network interface 106 and/or port 110 based on analyzing the contents of the data. For example, in certain embodiments, a switching element 104 may include a switch fabric (SWF).

Each network interface 106 may be communicatively coupled to switching element 104 and may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port may comprise a copper port, an optical port, or any other suitable port.

To be successfully switched through a network element (e.g., network element 102) it is not enough that the egress network interface 106 for a packet of traffic is known. The specific egress port 112, and possibly the specific egress flow may be required. To further illustrate, on ingress, a packet is associated with a flow local to the ingress network interface 106. On egress, the packet is forwarded based on flow information local to the egress network interface 106. In addition, a switching element 104 may forward the packet to the desired egress network interface 106 based on the global forwarding ID to which the ingress local forwarding ID maps to. However, each network interface 106 includes its own set of local flows, meaning a flow represented by a particular identifier in one network interface 106 may be unrelated to a flow represented by the same identifier in another network interface 106.

Accordingly, a mechanism is needed to logically link the global forwarding ID of switching element 104 to the local forwarding ID of the ingress network element 106 and egress network element 106. Traditionally, this was accomplished by assigning a forwarding identifier between each possible ingress network element 106 flow-to-egress network element 106 flow, as described in the "Background" section above.

However, in the present disclosure, network interfaces 106 and switching element 104 translate between local forwarding identifiers (LFIDs) and global forwarding identifiers (GFIDs) as described in greater detail below.

An LFID, as used in this disclosure, may be local to a network interface 106 and may constitute a forwarding identifier used to forward a packet within the network interface 106 itself. A LFID may only have relevance and scope to the network interface card 106 to which the LFID is associated (e.g., an LFID value of "x" in a first network interface 106 may be independent of the same LFID value of "x" in a second network interface 106).

At an ingress network interface 106 for a packet, an LFID for the packet may be determined by the network interface by mapping the ingress packet to a pre-configured flow of the ingress card. Such mapping may be performed by reference to one or more databases (e.g., tables, lists, maps, and/or other data structures) stored on the ingress network interface 106. The LFID value may be used for various packet processing and packet forwarding operations in the ingress network interface 106. Before the packet is handed over from network interface 106 to switching element 104, the LFID value may be translated to a GFID value. In some embodiments, the translation of an LFID to a GFID at the ingress network interface 106 may be performed using a direct lookup table.

A GFID, as used in this disclosure, may be global to the network element 102 and may constitute an identifier used to forward, by a switching element 104, a packet to the correct egress network interface 106. Accordingly, a GFID may be a destination-based, source-agnostic identifier, as compared to traditional forwarding IDs which are source and destination based. Thus, the requirement for number of GFIDs may be reduced and GFID management may be more memory efficient than traditional forwarding IDs, requiring a number of identifiers on the order of N (wherein N equals the number of ports in the network element), rather than N×(N−1), as is required in traditional approaches.

A GFID alone may not be sufficient to perform desired forwarding of a packet, due to the fact that a different network interface 106 may use different database (e.g., databases used to assign an LFID at an ingress network interface 106 as described above, and databases used to forward a packet at an egress network interface 106 based on an LFID, as described below) and a different forwarding identifier to forward the packet.

Accordingly, a GFID may be translated to an LFID at an egress network interface 106, the LFID local to the egress network interface. Such translation may be performed in any suitable manner. In some embodiments, the translation of a GFID to an LFID at the egress network interface 106 may be performed using a ternary content addressable memory. The LFID may be used by the egress network interface 106 to map the packet to the correct egress port 110 and/or correct egress flow, and forward based on such mapping. Such mapping may be performed by reference to one or more databases (e.g., tables, lists, maps, and/or other data structures) stored on the egress network interface 106.

Two separate identifiers, LFID and GFID, may be used because: (a) the range of a GFID value may be larger than the range of a LFID value; (b) there may be multiple packet forwarding operations in the network interface which are done by looking up information from different direct address tables, (c) the number of entries in a direct address table is smaller when the range of the index value is smaller, (d) constructing plurality of direct address tables with LFID value as index requires much less memory than constructing those tables with GFID value as index.

The forwarding of a packet and translation among LFIDs and GFIDs may be further illustrated by reference to FIG. 3.

FIG. 3 illustrates a flow chart of an example method 300 for forwarding data in network element 102, in accordance with certain embodiments of the present disclosure. According to one embodiment, method 300 may begin at step 302. As noted above, teachings of the present disclosure may be implemented in a variety of configurations of network 10. As such, the preferred initialization point for method 300 and the order of the steps 302-316 comprising method 300 may depend on the implementation chosen.

At step 302, a packet may be received at an ingress network interface 106 via an ingress port 110. At step 304, the ingress network port 106 may examine the packet to determine the LFID of the ingress network interface 106 associated with the flow of the ingressing packet. Such determination may be performed by reference to one or more databases (e.g., tables, lists, maps, and/or other data structures) stored on the ingress network interface 106. At step 306, ingress network interface 106 may convert the LFID to a GFID. Such conversion may be made by reference to a database (e.g., lookup table, list, map or other suitable data structure) stored on ingress network interface 106. In certain embodiments, such conversion may be made by reference to a direct lookup table. At step 308, the ingress network interface 106 may forward the packet to switching element 104.

At step 310, after the packet is received by switching element 104, switching element may determine the egress network interface 106 for the packet based on the GFID. Such determination may be made by reference to a database (e.g., lookup table, list, map or other suitable data structure) or a field in the internal packet header on switching element 104. At step 312, switching element 104 may forward the packet to the determined egress network interface 106.

At step 314, after the packet is received by egress network interface 106, egress network interface 106 may convert the GFID to an LFID of the egress network interface 106 associated with the flow of the packet. Such conversion may be made by reference to databases (e.g., tables, lists, maps, ternary content addressable memory, and/or other data structures) stored on egress network interface 106. At step 316, egress network interface 106 determine the appropriate egress port 110 and flow based on the egress network interface 106 LFID for the packet and forward the packet to the appropriate egress port 110 and flow. Such determination may be performed by reference to one or more databases (e.g., tables, lists, maps, or and/or other data structures) stored on the ingress network interface 106. After completion of step 316, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network element 102 or any other system operable to implement method 300. In certain embodiments, method 300 may be implemented partially or fully in software and/or firmware embodied in a memory or other computer-readable media.

A component of network 10 and/or a network element 102 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 and/or a network element 102 without departing from the scope of the invention. The components of network 10 and/or network element 102 may be integrated or separated. Moreover, the operations of network 10 and/or network element 102 may be performed by more, fewer, or other components. Additionally, operations of network 10 and/or a network element 102 may be performed using any suitable logic. As used in this document, "each" refers to each member of a set or each member of a subset of a set.

Certain embodiments of the invention may provide one or more technical advantages. A technical advantage of one embodiment may be that components of a network element may not need to maintain a numerous number of identifiers (e.g., forwarding identifiers), as it the case with traditional approaches.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A network element comprising:
a first network interface configured to:
receive a packet having a flow via a first port of the first network interface;
examine the packet to determine an ingress local forwarding identifier (LFID) of the first network interface associated with the flow of the packet, the LFID comprising a forwarding identifier used to forward the packet within the first network interface;
convert the ingress LFID to a global forwarding identifier (GFID) of the network element; and
forward the packet to a switching element communicatively coupled to the first network interface;
the switching element configured to:
based on the GFID, determine a second network interface communicatively coupled to the switching element for egress of the packet; and
forward the packet to the second network interface; and
the second network interface configured to:
convert the GFID to an egress LFID of the second network interface associated with the flow of the packet; and
forward the packet to a second port of the second network interface and a flow of the second network interface based on the egress LFID.

2. A network element in accordance with claim 1, wherein at least one of the first network interface and second network interface includes a line card.

3. A network element in accordance with claim 1, wherein the switching element includes a switch fabric.

4. A network element in accordance with claim 1, wherein the first network interface is configured to convert the ingress LFID to the GFID by reference to a database.

5. A network element in accordance with claim 1, wherein the second network interface is configured to convert the GFID to the egress LFID by reference to a database.

6. A network element in accordance with claim 1, wherein the switching element is configured to determine the second network interface for egress of the packet by reference to a database or a field in an internal header of the packet.

7. A method comprising:
receiving, by a first network interface, a packet having a flow via a first port of the first network interface;
examining, by the first network interface, the packet to determine an ingress local forwarding identifier (LFID) of the first network interface associated with the flow of the packet, the LFID comprising a forwarding identifier used to forward the packet within the first network interface;
converting, by the first network interface, the ingress LFID to a global forwarding identifier (GFID) of the network element;
forwarding, by the first network interface, the packet to a switching element communicatively coupled to the first network interface;
based on the GFID, determining, by the switching element, a second network interface communicatively coupled to the switching element for egress of the packet;
forwarding, by the switching element, the packet to the second network interface;
converting, by the second network interface, the GFID to an egress LFID of the second network interface associated with the flow of the packet; and
forwarding, by the second network interface, the packet to a second port of the second network interface and a flow of the second network interface based on the egress LFID.

8. A method in accordance with claim 7, wherein at least one of the first network interface and second network interface includes a line card.

9. A method in accordance with claim 7, wherein the switching element includes a switch fabric.

10. A method in accordance with claim 7, wherein converting the ingress LFID to the GFID includes referencing a database.

11. A method in accordance with claim 7, wherein converting the GFID to the egress LFID includes referencing a database.

12. A method in accordance with claim 7, determining the second network interface for egress of the packet includes referencing a database or a field in an internal header of the packet.

* * * * *